(12) United States Patent
Bono

(10) Patent No.: US 8,076,036 B2
(45) Date of Patent: Dec. 13, 2011

(54) FUEL CELL SYSTEM, OPERATION METHOD THEREOF, AND FUEL CELL VEHICLE

(75) Inventor: Tetsuya Bono, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 856 days.

(21) Appl. No.: 11/661,105

(22) PCT Filed: Apr. 11, 2006

(86) PCT No.: PCT/JP2006/308007
§ 371 (c)(1),
(2), (4) Date: Feb. 26, 2007

(87) PCT Pub. No.: WO2006/112427
PCT Pub. Date: Oct. 26, 2006

(65) Prior Publication Data
US 2008/0096057 A1    Apr. 24, 2008

(30) Foreign Application Priority Data
Apr. 14, 2005  (JP) ................... 2005-117082

(51) Int. Cl.
    H01M 8/04   (2006.01)
(52) U.S. Cl. ............... 429/428; 429/444; 429/446
(58) Field of Classification Search ........ 429/428, 429/444, 446
See application file for complete search history.

(56) References Cited

U.S. PATENT DOCUMENTS

| 6,210,821 | B1 * | 4/2001 | Lesieur et al. | 429/17 |
| 2003/0134164 | A1 * | 7/2003 | Reiser et al. | 429/13 |
| 2004/0202900 | A1 * | 10/2004 | Pavio et al. | 429/9 |
| 2006/0210849 | A1 * | 9/2006 | Bono | 429/22 |

FOREIGN PATENT DOCUMENTS

| DE | 11 2004 001 535 T5 | 6/2006 |
| JP | 2000-251911 | 9/2000 |
| JP | 2002-134139 | 5/2002 |
| JP | 2004-079451 | 3/2004 |
| JP | 2005-071797 | 3/2005 |
| JP | 2005-347185 | 12/2005 |
| WO | WO 2004049488 A2 * | 6/2004 |
| WO | WO 2005060036 A1 * | 6/2005 |

OTHER PUBLICATIONS

Certified Translation of JP 2005-347185A (Dec. 2005).*
Certified Translation of JP 2004-079451A (Mar. 2004).*

* cited by examiner

*Primary Examiner* — Gregg Cantelmo
(74) *Attorney, Agent, or Firm* — Kenyon & Kenyon LLP

(57) ABSTRACT

In order to prevent the fuel economy from being lowered by a wasteful discharge of fuel gas, in the operation method of a fuel cell system capable of performing intermittent operation for temporarily stopping power generation of the fuel cell, in the case where the secondary pressure of the tank regulator becomes at least a first threshold during intermittent operation, the intermittent operation is stopped and the normal operation is returned. In the case where the intermittent operation is stopped a number of times, subsequent intermittent operation may be prohibited.

11 Claims, 2 Drawing Sheets

FUEL CELL SYSTEM, OPERATION METHOD THEREOF, AND FUEL CELL VEHICLE

This is a 371 national phase application of PCT/JP2006/308007 filed 11 Apr. 2006, claiming priority to Japanese Patent Application No. 2005-117082 filed 14 Apr. 2005, the contents of which are incorporated herein by reference.

BACKGROUND

The present invention relates to a fuel cell system capable of performing intermittent operation, an operation method thereof, and a fuel cell vehicle, particularly to a technology which is effective in preventing the fuel economy from being lowered by a wasteful discharge of fuel gas.

For example, as a power generating system for a fuel cell vehicle, there is known a fuel cell system which can directly extract, as electrical energy, chemical energy obtained from an oxidation-reduction reaction between fuel gas and oxidation gas. In this type of fuel cell system, various valves (pressure regulating valve, cutoff valve, and the like, for example) are disposed in a hydrogen supply passage for supplying hydrogen from a hydrogen supply source to a fuel cell, and the hydrogen from the hydrogen supply source is regulated (pressure reduction) to predetermined pressure and then supplied to the fuel cell.

When any abnormality occurs in these valves or a control device, the pressure inside the hydrogen supply passage abnormally increases. Therefore, Japanese Patent Application Laid-Open No. 2002-134139, for example, discloses a technology in which a relief valve is provided in a hydrogen supply passage so that the hydrogen can be discharged to the outside by opening the relief valve when the pressure inside the hydrogen supply passage is pressurized to predetermined pressure or higher.

In the technology proposed in Japanese Patent Application Laid-Open No. 2002-134139, the hydrogen is discharged to the outside when the pressure inside the hydrogen supply passage is pressurized to predetermined pressure or higher, thus this technology is effective in preventing damage to the fuel cell, gas supply passage, and valves, but there is a concern that the fuel economy is lowered due to the discharged hydrogen.

SUMMARY

An object of the present invention, therefore, is to provide a fuel cell system, an operation method thereof, and a fuel cell vehicle which can prevent the fuel economy from being lowered by a wasteful discharge of fuel gas.

The operation method of a fuel cell system comprises gas systems in which reactant gas flows and a fuel cell connected to the gas systems, the fuel cell system being capable of performing intermittent operation for temporarily stopping power generation of the fuel cell, wherein in the case where the pressure of the gas systems is pressurized to predetermined pressure or higher during the intermittent operation, the intermittent operation is stopped.

According to such a configuration, by stopping the intermittent operation, power generation of the fuel cell is restarted (returns to the normal operation), thus the reactant gas inside the gas systems is consumed by the fuel cell. Therefore, even if the gas is not discharged to the surroundings an abnormal increase of the pressure of the gas systems can be resolved, preventing lowering of the fuel economy.

In the case where the intermittent operation is stopped a number of times, subsequent intermittent operation may be prohibited.

If the intermittent operation is stopped a number of times, it means that the pressure is increased to the predetermined pressure or higher a number of times during the intermittent operation. It is considered that one of the causes of such occurrence is because an abnormality occurs in the gas systems, e.g., an abnormality such as a sealing failure occurs in a pressure regulating valve which is disposed within the gas system and reduces (regulates) primary pressure to secondary pressure.

Therefore, in the case where the intermittent operation is stopped a number of times as described in the above configuration, it is judged that an abnormality occurs in the gas system, and subsequent intermittent operation is prohibited, whereby abnormal increase of the pressure of the gas system can be prevented from occurring.

In the case where, out of the gas systems, the pressure of the gas system connected to the anode electrode of the fuel cell is pressurized to predetermined pressure or higher, the intermittent operation may be stopped.

According to such a configuration, out of the gas systems (fuel gas system, oxidation gas system) connected to the fuel cell, measures for a gas leak can be carried out for the gas system (fuel gas system) in which reactant gas (fuel gas) of higher pressure flows.

The operation method of a fuel cell system having the above configuration further comprises an power storage device connected in parallel with the fuel cell to a load device, and can be applied to a fuel cell system which can perform intermittent operation for temporarily stopping power generation of the fuel cell and supplying required power from the power storage device to the load device.

In the case where the intermittent operation is stopped and the power generation of the fuel cell is restarted, the generated power may be at least either stored in the power storage device or consumed by the load device.

In the case where the pressure on an upstream side of the fuel cell is pressurized to normal operation pressure or higher, the intermittent operation may be stopped. The pressure on the upstream side of the fuel cell may be, for example, secondary pressure of a regulator disposed in the gas system or inlet pressure of the fuel cell. The regulator in this case may be the one placed on the uppermost stream out of a plurality of regulators disposed in the gas systems.

The gas system connected to the anode electrode comprises: a fuel gas circulation passage for refluxing unconverted fuel gas, which is discharged from the fuel cell, into the fuel cell; an anode off-gas flow passage for discharging the unconverted fuel gas from the fuel gas circulation passage to the outside of the system; and a purge valve which is disposed in the anode off-gas flow passage, wherein in the case where the pressure of the gas system connected to the anode electrode is pressurized to predetermined pressure or higher while the purge valve is closed, the intermittent operation may be stopped.

The gas system connected to the anode electrode comprises: a fuel gas circulation passage for refluxing unconverted fuel gas, which is discharged from the fuel cell, into the fuel cell; and a circulating pump which is disposed in the fuel gas circulation passage, wherein in the case where the pressure of the gas system connected to the anode electrode is pressurized to predetermined pressure or higher while the circulating pump is stopped, the intermittent operation may be stopped.

The operation method of a fuel cell system having the above configuration can be applied to a fuel cell vehicle installed with the fuel cell.

According to such a configuration, in order to resolve an abnormal increase of the pressure of the gas systems, for example, it is only necessary to add a simple sequence of restarting power generation of the fuel cell during an intermittent operation thereof. Therefore, the control logic of the fuel cell system and thus the vehicle is not excessively complicated. Further, reactant gas inside the gas system is consumed by means of the power generation of the fuel cell without discharging the reactant gas to the surroundings, thus the fuel economy, i.e., the traveling distance, can be improved.

The fuel cell system of the present invention comprises: gas systems in which reactant gas flows; a fuel cell connected to the gas systems; a pressure sensor which detects the pressure of the gas systems; and a control device which controls power generation of the fuel cell, the fuel cell system being capable of intermittent operation for temporarily stopping the power generation of the fuel cell, wherein in the case where the control device detects during the intermittent operation that the pressure of the gas system is at least predetermined pressure, the control device stops the intermittent operation.

The intermittent operation is an operation state in which power generation of the fuel cell is temporarily stopped due to, for example, low load, and the control device stops supply of the reactant gas to the fuel cell. During this intermittent operation, if the control device detects that the pressure of the gas system is at least predetermined pressure, the control device restarts the power generation of the fuel cell.

Accordingly, the reactant gas inside the gas systems is consumed by the fuel cell, thus even if the gas is not discharged to the surroundings, abnormal increase of the pressure of the gas system can be resolved, preventing lowering of the fuel economy.

In the case where the intermittent operation is stopped a number of times, the control device may prohibit subsequent intermittent operation.

Furthermore, when the pressure of the gas system connected to the anode electrode of the fuel cell, out of the gas systems, is pressurized to the predetermined pressure or higher, the intermittent operation may be stopped.

The fuel cell system having the above configuration further comprises an power storage device connected in parallel with the fuel cell to a load device, and may be able to perform intermittent operation for temporarily stopping power generation of the fuel cell and supplying required power from the power storage device to the load device.

In the case where the intermittent operation is stopped and the power generation of the fuel cell is restarted, the generated power may be at least either stored in the power storage device or consumed by the load device.

In the case where the pressure on an upstream side of the fuel cell is pressurized to normal operation pressure or higher, the control device may stop the intermittent operation.

The pressure on the upstream side of the fuel cell may be secondary pressure of a regulator disposed in the gas system or inlet pressure of the fuel cell. The regulator may be the one placed on the uppermost stream out of a plurality of regulators disposed in the gas systems.

The gas system connected to the anode electrode comprises: a fuel gas circulation passage for refluxing unconverted gas, which is discharged from the fuel cell, into the fuel cell; an anode off-gas flow passage for discharging the unconverted fuel gas from the fuel gas circulation passage to the outside of the system; and a purge valve which is disposed in the anode off-gas flow passage, wherein in the case where the pressure of the gas system connected to the anode electrode is pressurized to predetermined pressure or higher while the purge valve is closed, the control device may stop the intermittent operation.

The gas system connected to the anode electrode comprises: a fuel gas circulation passage for refluxing unconverted fuel gas, which is discharged from the fuel cell, into the fuel cell; and a circulating pump which is disposed in the fuel gas circulation passage, wherein in the case where the pressure of the gas system connected to the anode electrode is pressurized to predetermined pressure or higher while the circulating pump is stopped, the control device may stop the intermittent operation.

The fuel cell vehicle according to the present invention comprises the fuel cell system having any of the above configurations.

It should be noted that the power storage device according to the present invention can employ, for example, a secondary battery or a capacitor.

Moreover, "normal operation pressure" in the present invention is the pressure in a range tolerated in the normal operation, and, for example, the pressure which is obtained by adding predetermined acceptable fluctuating pressure to the normal working pressure corresponds to the normal operation pressure.

DETAILED DESCRIPTION

Figure 1:
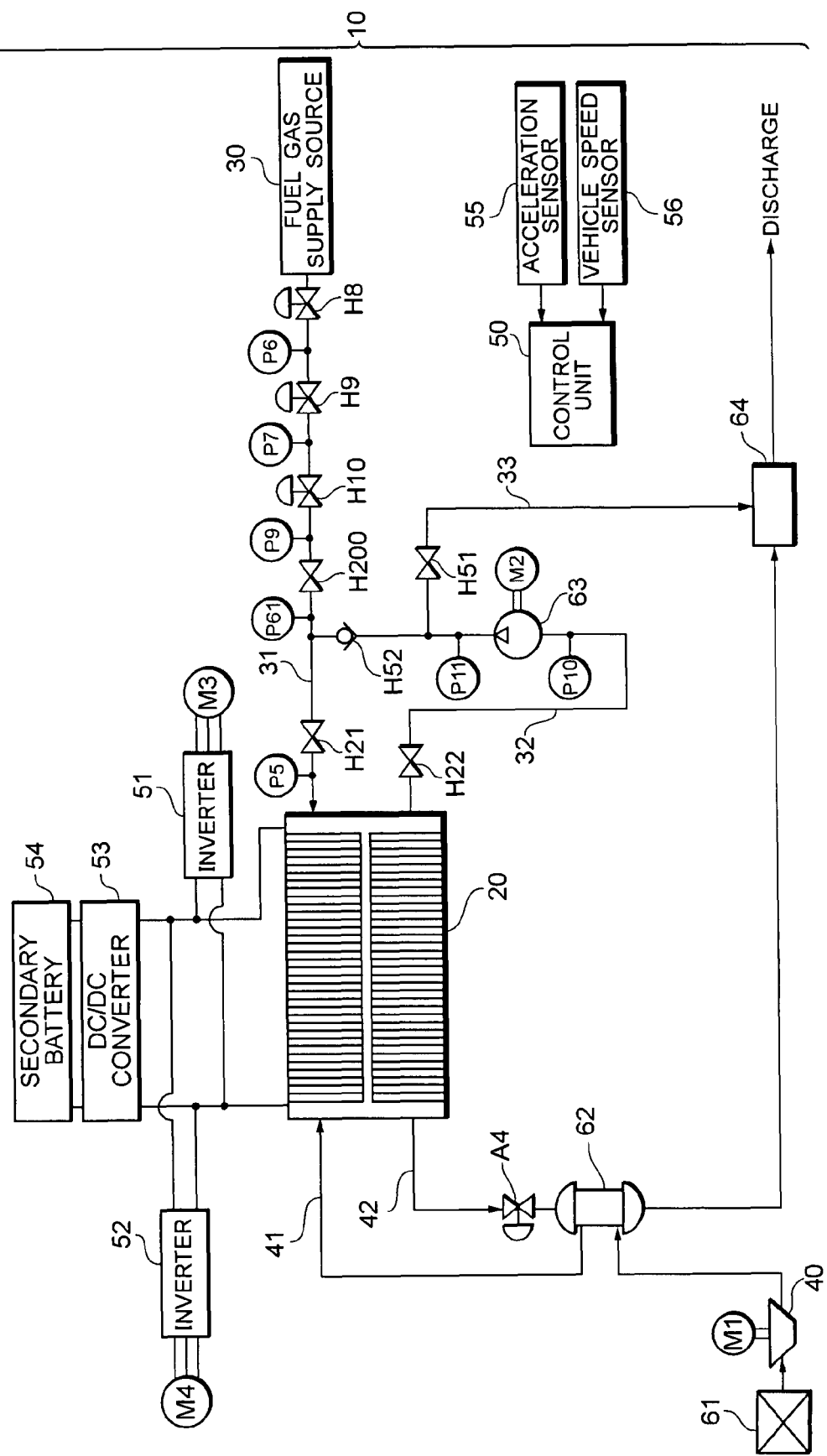
FIG. 1 is a schematic configuration diagram showing an embodiment of the fuel cell system according to the present invention.

FIG. 1 is a schematic configuration diagram showing the fuel cell system according to the present embodiment. Here, the present embodiment shows an example in which the fuel cell system 10 is used as an on-board power generating system of a fuel cell vehicle (FCEV), but the present embodiment can be applied to a stationary power generating system in which a fuel cell is used as a power generating unit for a building (residence and other buildings).

A fuel cell 20 has a stack structure which is formed by stacking a plurality of single cells, and is configured from, for example, a solid molecular electrolyte type fuel cell or the like.

A fuel gas supply system (gas system) of the fuel cell 20 has disposed therein a fuel gas supply source 30, a fuel gas supply passage 31, and a fuel gas circulation passage 32. Here, the fuel gas supply system is a generic term for gas pipe lines, valves, and the like disposed on a passage for supplying fuel gas from the fuel gas supply source 30 to the fuel cell 20, and comprises, for example, the fuel gas supply source 30, the fuel gas supply passage 31 connecting the fuel gas supply source 30 and the fuel cell 20, on-off valves, regulators and the like provided in the fuel gas supply passage 31.

As in the present embodiment, in the case of employing a system configuration for circulating fuel gas, which is emitted from the fuel cell 20, into the fuel gas supply passage 31, the fuel gas supply system further comprises the fuel gas circulation passage 32. The fuel gas supply source 30 is configured by, for example, a hydrogen storage source such as a high-pressure hydrogen tank, hydrogen storage tank, or hydrogen absorbing tank, or a reformer for reforming a raw material into hydrogen rich gas.

The fuel gas supply passage 31 is a gas flow passage for leading the fuel gas, which is discharged from the fuel gas supply source 30, to the anode electrode of the fuel cell 20, and this gas flow passage is provided with, starting from an upstream through a downstream thereof, a tank regulator H8, a high pressure regulator H9, a low pressure regulator H10, a hydrogen supply valve H200, and a fuel cell stack inlet valve ("FC inlet valve", hereinafter) H21.

Fuel gas, which is compressed to high pressure (35 MPa, 70 MPa, for example), is depressurized at the tank regulator H8, thereafter depressurized to medium pressure at the high pressure regulator H9, and then further depressurized to low pressure (normal operation pressure, e.g., 1 MPa) at the low pressure regulator H10. The fuel gas circulation passage 32 is a return gas flow passage for circulating unconverted fuel gas into the fuel cell 20, and this gas flow passage is provided with, starting from an upstream through a downstream thereof, a fuel cell stack outlet valve ("FC outlet valve", hereinafter) H22, a hydrogen circulating pump 63, and a check valve 52.

Low-pressure unconverted fuel gas, which is discharged from the fuel cell 20, is pressurized moderately by the hydrogen circulating pump 63 and led to the fuel gas supply passage 31. The check valve 52 prevents the fuel gas from flowing backward from the fuel gas supply passage 31 to the fuel gas circulation passage 32. The anode off-gas flow passage 33 is a gas flow passage for discharging hydrogen off-gas, which is emitted from the fuel cell 20, to the outside of the system, and this gas flow passage is provided with a purge valve H51.

The abovementioned hydrogen supply valve H200, FC inlet valve H21, FC outlet valve H22, and purge valve H51 are shut-off valves for supplying fuel gas to each of the gas flow passages 31 through 33 or to the fuel cell 20 or blocking the fuel gas, and are configured from, for example, electromagnetic valves. As such electromagnetic valves, it is preferred to use, for example, an on-off valve, linear valve capable of linearly adjusting the degree of opening thereof by PWM control, or other valves.

In an oxidation gas supply system (gas system) of the fuel cell 20, an air compressor 40, an oxidation gas supply passage 41, and a cathode off-gas flow passage 42 are disposed. The air compressor 40 compresses the air which is taken in from the outside air via an air filter 61, and supplies this compressed air as oxidation gas to the cathode electrode of the fuel cell 20. Oxygen off-gas, which is obtained after being applied to cell reaction of the fuel cell 20, flows thought the cathode off-gas flow passage 42 and is then discharged to the outside of the system.

The oxygen off-gas contains water moist generated by a cell reaction in the fuel cell 20 and thus is in a highly humidified state. A humidifier module 62 exchanges water vapor between oxygen gas in a low humidified state, which flows in the oxygen gas supply passage 41, and the oxygen off-gas in a highly humidified state, which flows in the cathode off-gas flow passage 42, and moderately humidifies the oxidation gas supplied to the fuel cell 20. Back pressure of the oxidation gas supplied to the fuel cell 20 is regulated by a pressure regulating valve A4 which is disposed in the vicinity of a cathode outlet of the cathode off-gas flow passage 42.

A downstream of the cathode off-gas flow passage 42 is communicated with a diluting device 64 to supply the oxygen off-gas to the diluting device 64. The diluting device 64 is also communicated with a downstream of the anode off-gas flow passage 33 and is configured so as to discharge the hydrogen off-gas after diluting it by mixing with the oxygen off-gas.

A part of direct-current power generated by the fuel cell 20 is stepped down by a DC/DC converter 53 and charged in a secondary battery (power storage device) 54. The secondary battery 54 plays a roll of a regenerative energy storage source at the time of vehicle braking, or an energy buffer at the time of load fluctuation caused at the time of acceleration or deceleration of a vehicle, and is configured from a Ni—Cd battery, nickel-hydrogen battery, lithium secondary battery, and the like.

A traction inverter (load device) 51 and an auxiliary inverter (load device) 52 convert the direct-current power supplied from both or either one of the fuel cell 20 and secondary battery 54 into alternating-current power and supply the alternating-current power to a traction motor (load device) M3 and an auxiliary motor (load device) M4 respectively. The auxiliary motor M4 is a generic term for a motor (load device) M2 driving the hydrogen circulating pump 63, which is described hereinafter, a motor (load device) M1 driving the air compressor 40, and the like.

A control unit 50 is configured mainly by a known CPU, RAM, and ROM, obtains target power (request output) Pr to be outputted by the fuel cell 20, on the basis of acceleration opening detected by an acceleration sensor 55, vehicle speed detected by a vehicle speed sensor 56, and the like, and controls the fuel cell system 10 so that the output power of the fuel cell 20 corresponds with this target power.

Specifically, the control unit 50 adjusts the rotation speed of the motor M1 driving the air compressor 40 to adjust the amount of oxidation gas to be supplied, and adjusts the rotation speed of the motor M2 driving the hydrogen circulating pump 63 to adjust the amount of fuel gas to be supplied. Furthermore, the control unit 50 controls the DC/DC converter 53 to adjust an operation point (output voltage, output current) of the fuel cell 20 so that the output power of the fuel cell 20 corresponds with the target power.

Hereinafter, such control is sometimes referred to as "normal power generation control", and an operation state of the fuel cell 20 in which such control is performed is sometimes referred to as "normal operation".

It should be noted that the target power Pr of the fuel cell 20 is a sum of power consumption of the traction motor M3 and of the auxiliary motor M4 and charged power of the secondary battery 54. If the secondary battery 54 has an electric discharge request for the load devices, the discharged power of the secondary battery 54 is subtracted from the power consumption of the traction motor M3 and of the auxiliary motor M4. An electric charge and discharge request (including zero electric charge and discharge request) for the secondary battery 54 is determined in accordance with an SOC (State Of Charge) of the secondary battery 54.

It should be noted that the fuel gas supply system comprises four sections: a high voltage section (section between the tank regulator H8 and the hydrogen supply valve H200), a low voltage section (section between the hydrogen supply valve H200 and the FC inlet valve H21), a FC section (section between the FC inlet valve H21 and the FC outlet valve H22), and a circulating section (section between the FC outlet valve H22 and the check valve H52). Pressure sensors P6, P7, P9, P61, P5, P10, and P11 for detecting the pressure of the fuel gas are disposed in each of the sections.

More specifically, the pressure sensor P6 detects secondary pressure of the tank regulator H8, the pressure sensor P7 detects secondary pressure of the high voltage regulator H9, and the pressure sensor P9 detects secondary pressure of the low voltage regulator H10. Moreover, the pressure sensor P61 detects the pressure of a low voltage section of the fuel gas supply passage 31, the pressure sensor P5 detects stack inlet pressure, the pressure sensor P10 detects the pressure on an input port side (upstream side) of the hydrogen circulating pump 63, and the pressure sensor P11 detects the pressure on an output port side (downstream side) of the hydrogen circulating pump 63.

Figure 2:
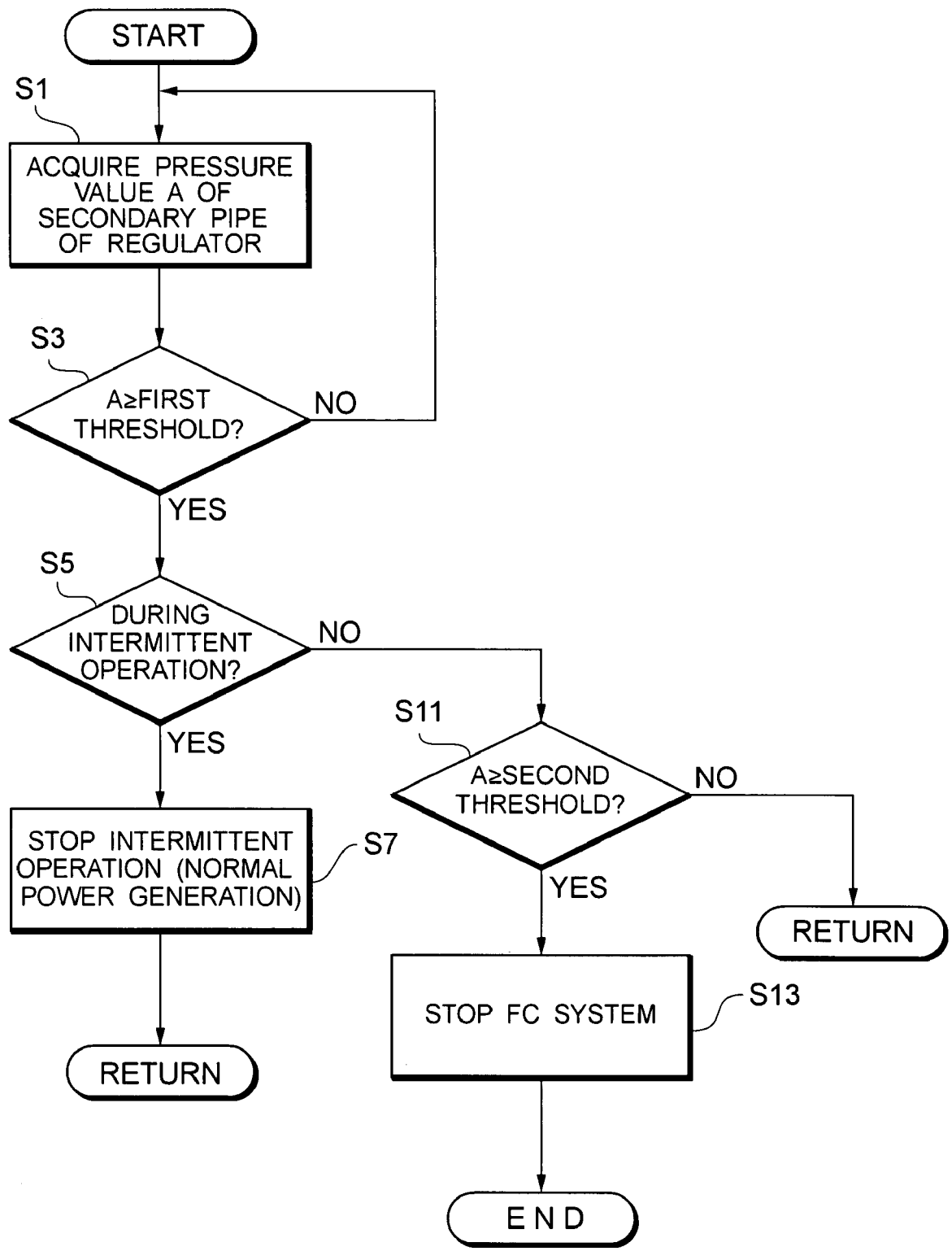
FIG. 2 is a flowchart for explaining a substantial part of a control flow of a control section shown in FIG. 1.

FIG. 2 is an example of a subroutine executed by the control unit (control device) 50. This subroutine is called every predetermined cycle or at the time of a predetermined event in a main control program executed by the control unit 50. Hereinafter, summary of the operation state of the fuel cell 20 before the subroutine shown in FIG. 2 is called is described first, and then the detail of each processing shown in the figure is described.

First of all, when the fuel cell system 10 is activated, the control unit 50 judges, for example, a gas leak of the fuel gas supply system, and when judging that it is a state where power generation can be performed normally, the control unit 50 performs the abovementioned normal power generation control (normal operation). When the normal operation is continued and a predefined intermittent operation start condition is satisfied, the control unit 50 shifts the operation state of the fuel cell 20 from the normal operation to an intermittent operation.

The intermittent operation is an operation mode for temporarily stopping power generation of the fuel cell 20 at the time of low load operation such as idling, low speed running, and regenerative braking. Running in this operation mode is a running using power supplied from the secondary battery 54 or a running while regenerative braking is active.

When the subroutine shown in FIG. 2 is called, the control unit 50 acquires a pressure value A of a secondary pipe of the tank regulator H8 (step S1). This pressure value A is detected by the pressure sensor P6. Next, it is determined whether this pressure value A is a first threshold (7 MPa, for example) or higher (step S3). If a result of the determination is "NO", i.e., if "pressure value A<first threshold", the processes of the steps S1 and S3 are repeated.

On the other hand, if the result of the determination in the step S3 is "YES", i.e., if "pressure value A≧first threshold", the step proceeds to a step S5 where it is determined whether the operation state of the fuel cell 20 is the intermittent operation state or not. If the operation state is the intermittent operation state (determination result: YES), the intermittent operation is stopped, and the operation state of the fuel cell 20 is returned to the normal operation from the intermittent operation (step S7).

For example, if the intermittent operation is performed at the time of idling, stopped power generation is canceled and the fuel cell 20 is caused to perform idling power generation. If the intermittent operation is performed at the time of low load running, stopped power generation is canceled and the fuel cell 20 is caused to perform running power generation. Consequently, power generation of the fuel cell 20 is restarted (normal operation is returned), and the fuel gas inside the fuel gas supply system is consumed by the fuel cell 20. The power which is obtained in this power generation may be stored in the secondary battery 54 or consumed by the load device.

Therefore, although the operation state of the fuel cell 20 is the intermittent operation state, a small gas leak occurs due to a sealing failure between a valve seat and a valve element in, for example, the tank regulator H8. As a result, even in the case where the secondary pressure of the tank regulator H8 is increased abnormally to predetermined pressure or higher, if the amount of fuel gas consumed by power generation is larger than the amount of gas leak from the primary to the secondary of the tank regulator H8, the abnormal increase of the pressure can be resolved without carrying out control, which is not within a scope of the normal operation control, or discharge of gas to the surroundings, and the secondary (downstream side) part of the tank regulator H8 can be protected from a failure/damage and the like. Therefore, the relief valve for resolving the abnormal increase of the pressure is not required.

Returning to FIG. 2, if the determination result in the step S5 is "NO", i.e., if the operation state of the fuel cell 20 is not the intermittent operation state, the step proceeds to a step S11 where it is determined whether the pressure value A acquired in the step S1 is a second threshold (10 MPa, for example) or higher. If the determination result is "YES" here, i.e., if "pressure value A≧second threshold", the fuel cell system 10 is stopped (step S13). If the determination result is "NO", i.e., if "pressure value A<second threshold", the present subroutine is repeated.

In the present embodiment, "first threshold<second threshold", but may be also "first threshold=second threshold". In this case, if it is determined in the step S5 of FIG. 2 that the operation state is not the intermittent operation state (step S5: NO), the fuel cell system 10 is stopped immediately (step S13).

As described above, in the present embodiment, in the case where the pressure of the fuel gas supply system (secondary pressure of the tank regulator H8) is pressurized to predetermined pressure (first threshold) or higher (pressure value A≧first threshold) when the operation state of the fuel cell 20 is the intermittent operation state, the intermittent operation is stopped and the power generation of the fuel cell 20 is restarted so that the fuel gas inside the fuel gas supply system is consumed by the fuel cell 20.

For this reason, although the operation state is the intermittent operation state, even if the gas pressure on the downstream side lower than the tank regulator H8 is abnormally increased due to a sealing failure in the tank regulator H8, the operation state of the fuel cell 20 can be simply shifted from the intermittent operation sate to the normal operation state, whereby the abnormal increase of the pressure can be resolved.

Therefore, it is not necessary to carry out the control, which is not within a scope of the normal operation control, or discharge of gas to the surroundings, and lowering of the fuel economy can be prevented. Further, out of the gas supply systems connected to the fuel cell 20, measures for a gas leak can be carried for the fuel gas supply system in which the fuel gas of higher pressure flows.

Moreover, in order to resolve an abnormal increase of the gas pressure in the fuel gas supply system, it is only necessary to add a simple sequence of, for example, restarting the power generation of the fuel cell 20, thus the control logic of the fuel cell system 10 and thus the fuel cell vehicle is not excessively complicated. Furthermore, the abnormal increase of the pressure is resolved by means of the power generation of the fuel cell 20 without discharging the reactant gas to the surroundings, thus the fuel economy, i.e., the traveling distance, can be improved.

OTHER EMBODIMENT

The above has described the embodiment of the present invention with reference to the drawings, but the specific configuration is not limited to this embodiment, and thus is included in the scope of the present invention even if a design change or the like is made without departing from the scope of the present invention. For example, in the case where the intermittent operation is stopped a number of times in the above embodiment, subsequent intermittent operation may be prohibited.

For example, when the processing of the step S7 shown in FIG. 2 (stop of the intermittent operation) is carried out, "1", which indicates that the intermittent operation has been stopped previously, is set as an intermittent operation stop flag. Then, even when the abovementioned predefined intermittent operation start condition is satisfied, the intermittent operation is not performed when "intermittent operation stop flag=1" during the main control program is executed by the control unit 50.

Specifically, when the intermittent operation is stopped a number of times, it means that the gas pressure is abnormally increased a number of times during the intermittent operation. It is considered that one of the causes of such occurrence is, for example, a sealing failure occurs in the tank regulator H8 inside the fuel gas supply system and this sealing failure is developed to a respectable degree, whereby a repair is required.

Therefore, in the case where the intermittent operation is stopped a plurality of times, it is determined that there is an abnormality in the fuel gas supply system and subsequent intermittent operation is prohibited, whereby an abnormal increase of the gas pressure in the fuel gas supply system can be prevented beforehand.

It should be noted that "0", which indicates that the intermittent operation has not been stopped before, is set as the intermittent operation stop flag every time when, for example, the fuel cell system 10 is activated or when a predetermined reset operation is performed.

In the above embodiment, control is performed to stop or continue the intermittent operation on the basis of the secondary pressure of the tank regulator H8, which is detected using the pressure sensor P6, but a determination may be made as to whether to stop or continue the intermittent operation, on the basis of the secondary pressure of the high pressure regulator H9 or low pressure regulator H10, which is detected using other pressure sensor P7 or P9, or the pressure on the fuel cell inlet side, which is detected using the pressure sensor P5.

Moreover, in the case where the pressure of the fuel gas supply system (for example, the secondary pressure of the regulators H8 through H10, the inlet side pressure of the fuel cell 20, the pressure on the inlet port side or outlet port side of the hydrogen circulating pump 63) is pressurized to predetermined pressure (normal operation pressure) or higher while the purge valve H51 is closed or the circulating pump 63 is stopped, the intermittent operation may be stopped.

Furthermore, in the case where not only the pressure on the fuel gas supply system side but also the pressure on the oxidation gas supply system is pressurized to predetermined pressure or higher during intermittent operation, the intermittent operation may be stopped.

The fuel cell system of the present invention does not necessary have the power storage device (secondary battery 54) as described in the above embodiment. For example, in the case where the fuel cell system of the present invention is applied to a vehicle in which power is supplied only from the fuel cell to the drive motor, intermittent operation is possible in which power generation of the fuel cell is temporarily stopped during regenerative braking.

According to the present invention, by switching the operation state of the fuel cell from the intermittent operation state where the power generation of the fuel cell is temporarily stopped to the normal operation state where the power generation of the fuel cell is restarted, the power generation of the fuel cell can be restarted (returns to the normal operation), whereby the reactant gas inside the gas system is consumed by the fuel cell. As a result, an abnormal increase of the pressure of the gas system can be resolved without discharging the gas to the surroundings, thus lowering of the fuel economy is prevented.

Therefore, the present invention can be widely used in a fuel cell system, operation method thereof, ad a fuel cell vehicle which are required to resolve such problems.

The invention claimed is:

1. An operation method of a fuel cell system comprising gas systems in which reactant gas flows, and a fuel cell connected to the gas systems, the fuel cell system being capable of performing intermittent operation for temporarily stopping power generation of the fuel cell and normal operation where the fuel cell generates power, the method comprising the steps of:
    acquiring a pressure value on an upstream side of the fuel cell;
    stopping intermittent operation of fuel cell when the pressure on the upstream side of the fuel cell is pressurized to normal operation pressure or higher; and
    restarting power generation of the fuel cell when intermittent operation is stopped,
    wherein the pressure on the upstream side of the fuel cell is secondary pressure of a regulator disposed in the gas system.

2. The operation method of a fuel cell system as defined in claim 1, wherein when the intermittent operation is stopped a number of times, then subsequent intermittent operation is prohibited.

3. The operation method of a fuel cell system as defined in claim 1, wherein when the pressure of the gas system connected to an anode electrode of the fuel cell is pressurized to predetermined pressure or higher, then the intermittent operation is stopped.

4. The operation method of a fuel cell system as defined in claim 1, further comprising a power storage device connected in parallel with the fuel cell to a load device,
    wherein intermittent operation for temporarily stopping power generation of the fuel cell and supplying required power from the power storage device to the load device is possible.

5. The operation method of a fuel cell system as defined in claim 4, wherein, wherein when the intermittent operation is stopped and the power generation of the fuel cell is restarted, then the generated power is at least either stored in the power storage device or consumed by the load device.

6. The operation method of a fuel cell system as defined in claim 1, wherein the regulator is the one positioned on the uppermost stream out of a plurality of regulators disposed in the gas systems.

7. The operation method of a fuel cell system as defined in claim 3, wherein the gas system connected to the anode electrode comprises:
    a fuel gas circulation passage for refluxing unconverted fuel gas, which is discharged from the fuel cell, into the fuel cell;
    an anode off-gas flow passage for discharging the unconverted fuel gas from the fuel gas circulation passage to the outside of the system; and
    a purge valve which is disposed in the anode off-gas flow passage,
    wherein when the pressure of the gas system connected to the anode electrode is pressurized to predetermined pressure or higher while the purge valve is closed, then the intermittent operation is stopped.

8. The operation method of a fuel cell system as defined in claim 3, wherein the gas system connected to the anode electrode comprises:
- a fuel gas circulation passage for refluxing unconverted fuel gas, which is discharged from the fuel cell, into the fuel cell; and
- a circulating pump which is disposed in the fuel gas circulation passage,
- wherein when the pressure of the gas system connected to the anode electrode is pressurized to predetermined pressure or higher while the circulating pump is stopped, then the intermittent operation is stopped.

9. The operation method of a fuel cell system as defined in claim 1, wherein the fuel cell system is mounted in a fuel cell vehicle.

10. An operation method of a fuel cell system comprising gas systems in which reactant gas flows, and a fuel cell connected to the gas systems, the fuel cell system being capable of performing intermittent operation for temporarily stopping power generation of the fuel cell and normal operation where the fuel cell generates power, the method comprising the steps of:
- acquiring a pressure value on an upstream side of the fuel cell;
- stopping intermittent operation of fuel cell when the pressure on the upstream side of the fuel cell is pressurized to normal operation pressure or higher; and
- restarting power generation of the fuel cell when intermittent operation is stopped,
- wherein the pressure on the upstream side of the fuel cell is inlet pressure of the fuel cell.

11. The operation method of a fuel cell system as defined in claim 10, wherein when the intermittent operation is stopped a number of times, then subsequent intermittent operation is prohibited.

* * * * *